United States Patent [19]

Srihari et al.

[11] Patent Number: 4,654,875
[45] Date of Patent: Mar. 31, 1987

[54] SYSTEM TO ACHIEVE AUTOMATIC RECOGNITION OF LINGUISTIC STRINGS

[75] Inventors: Sargur N. Srihari, Williamsville; Jonathan J. Hull, Tonawanda, both of N.Y.

[73] Assignee: The Research Foundation of State University of New York, Albany, N.Y.

[21] Appl. No.: 496,827

[22] Filed: May 23, 1983

[51] Int. Cl.⁴ .............................................. G06K 9/72
[52] U.S. Cl. ........................................ 382/40; 382/57
[58] Field of Search .................. 382/40, 37, 38, 57, 382/1, 36; 381/52, 44; 371/67–69

[56] References Cited

U.S. PATENT DOCUMENTS

| | | | |
|---|---|---|---|
| 3,114,980 | 12/1963 | Davis | 382/1 |
| 3,188,609 | 6/1965 | Harmon et al. | 382/40 |
| 3,646,576 | 2/1972 | Griggs | 381/44 |
| 3,969,698 | 7/1976 | Bollinger et al. | 382/40 |

Primary Examiner—Leo H. Boudreau
Attorney, Agent, or Firm—Robert Shaw

[57] ABSTRACT

A method (and system) to achieve automatic language recognition that includes the steps of introducing language in the form of strings to a mechanism that converts the language to electrical signals derived from the strings introduced, which electrical signals are the electrical analog of words in the strings; analyzing the electrical signals to achieve automatic recognition of the letters in a word of the text on the basis of an integration of (a) channel characteristics in the form of probabilities that the particular letter is a corruption of another letter, (b) the probabilities of the letter occurring serially with other recognized letters that precede the letter being analyzed, and (c) lexical information in the form of acceptable words represented as a graph structure and presenting as output a reproduction of the text introduced and analyzed.

23 Claims, 1 Drawing Figure

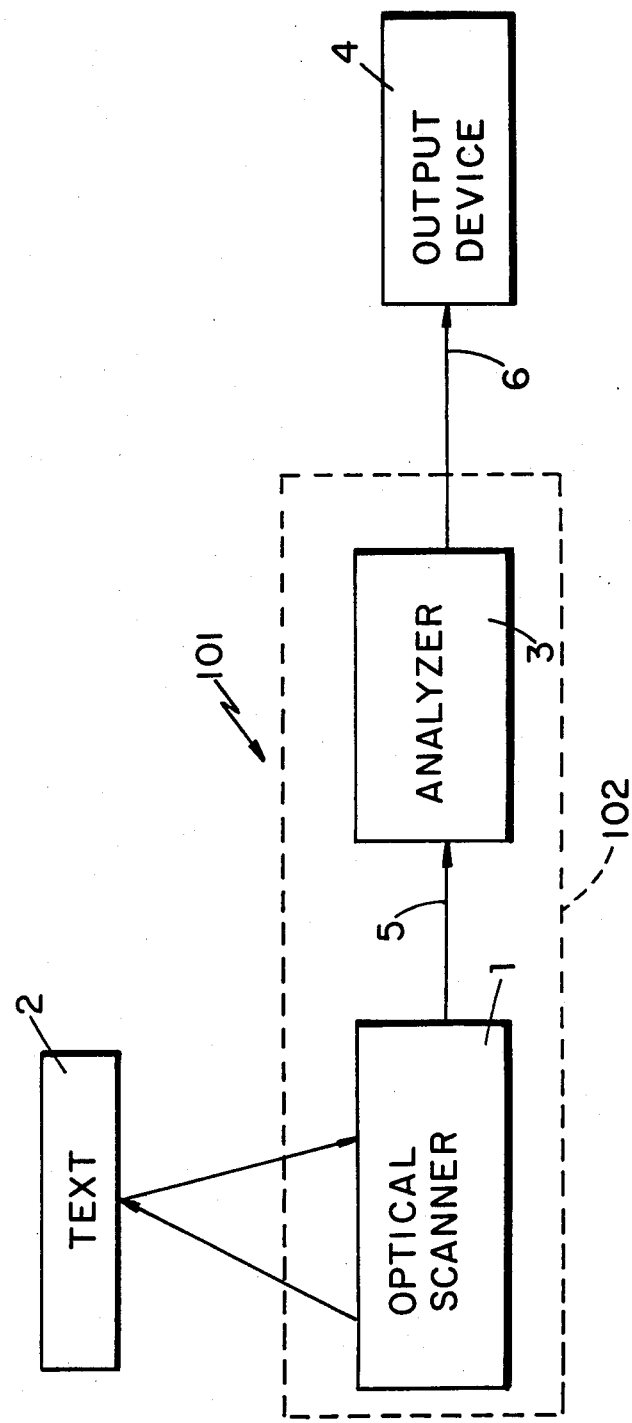

SYSTEM TO ACHIEVE AUTOMATIC RECOGNITION OF LINGUISTIC STRINGS

The invention was made with government support under grant number IST-80-10830 awarded by the National Science Foundation. The government has certain rights in this invention.

The present invention relates to systems to achieve automatic recognition of text.

Attention is called to a number of papers authored by the present inventors (Srihari and Hull) together with another: "Integrating Diverse Knowledge Sources in Text Recognition," Srihari et al. (June 21–23, 1982, Conference Abstract); "Integrating Diverse Knowledge Sources in Text Recognition," Srihari et al. (June 21–23, 1982, Proceedings Supplement); "Integration of Bottom-up and Top-down Contextual Knowledge in Text Error Correction," Srihari et al. (June 1982); "Knowledge Integration in Text Recognition," Srihari et al. (August 1982); and "Integrating Diverse Knowledge Sources in Text Recognition," Srihari et al. (1983). The papers are drawn upon heavily in the present specification.

The capabilities of present commercial machines for producing correct text by recognizing words in print, handwriting and speech are very limited. For example, most optical character recognition (OCR) machines are limited to a few fonts of machine print, or text that is handprinted under certain constraints; any deviation from these constraints will produce highly-garbled text. There is described herein an algorithm for text recognition/correction that effectively integrates a bottom-up refinement process that is based on the utilization of transitional probabilities and letter a posteriori probabilities, known as the Viterbi Algorithm (VA), together with a top-down process based on searching a trie structure representation of a lexicon. The algorithm is applicable to correcting text containing an arbitrary number of character substitution errors such as that produced by OCR machines. It is directly applicable to the classification of electrical signals from a scanner, that characterize the letters of words in the text. It is also applicable to the classification of set of shape features derived from visual images of letter input to an optical scanner.

The VA is a method of finding the word with the maximum a posteriori probability over all possible letter combinations and not necessarily those in a lexicon; it is based on a dynamic programming formulation which leads to a recursive algorithm. The algorithm can be viewed as a procedure to find the shortest path through a directed graph called a trellis. The negative of the log transitional probabilities are associated with the edges of the trellis and the negative log letter a posteriori probabilities are associated with the nodes. The cost of a path is then the sum of all the edge and node values in the path. Some generalizations of the VA have used either a fixed but small number of alternatives per letter of the input word, called the Modified Viterbi Algorithm (MVA) or a variable number of alternatives per letter; these alternatives can be determined by the letters that have the highest a posteriori probability.

The VA (and its variations) is a purely bottom-up approach whose performance may be unacceptable due to the fact that the resulting strings do not necessarily belong to a dictionary. One approach to this problem is to use top-down contextual information, in the form of a dictionary of allowable input words, to aid the bottom-up performance of the VA.

The trie data structure is suitable for determining whether a given string is an initial substring, or prefix of a word in the lexicon. Essentially, the trie represents words as ordered lists of characters, elements of which are represented as nodes in a binary tree. Since the VA proceeds by computing the most likely prefix of letters given an observed string of symbols (letters, feature sets, or electrical signals), the trie is an efficient data structure.

According to the present teaching, simultaneous search of the VA trellis using a variable number of character alternatives per input letter and the trie structure is achieved using a binary array A. Element $A(j\ i)$ is set to 1 if the jth letter of the alphabet is a possible correction for the ith symbol of the input word, and 0 otherwise. Thus the paths of the trellis that need to be evaluated are only those data that begin at the 1's of the first column of A and proceed through the 1's of the subsequent columns. Before evaluating the likelihood of the path that proceeds from one column of A to the next column, that path is determined to be legal with respect to the trie. The computational complexity of the resulting algorithm is of the same order as the VA.

Accordingly, it is an object of the present invention to provide a new, one-pass, low-cost method for recognition of handwritten, typewritten or typeset text.

Another objective is to provide a method that allows the maximum a posteriori estimate to be computed for every input string of symbols, where output words are constrained to be found in a dictionary of acceptable or allowable words.

Still another objective is to provide a text-recognition scheme that greatly increases the recognition rate of a linguistic string without significantly increasing the search time or performing an exhaustive search through the lexicon.

A further objective is to provide a method of correcting words that may contain an arbitrary number of substitutions of incorrect letters for correct ones.

These and still further objectives are addressed hereafter.

The foregoing objectives are achieved, generally, in a onepass system to achieve automatic language recognition wherein language in the form of input strings or structures is analyzed on the basis of: channel characteristics in the form of probabilities that a letter in the input is a corruption of another letter or, more generally, class-conditional probabilities (i.e., probability of the observed symbol for each possible state of nature); the probabilities of the letter occurring serially with other recognized letters that precede the letter being analyzed or particular strings of letters occurring serially; and lexical information in the form of acceptable words represented as a graph structure. The input language is typically text received from an optical character reader and the output typically is a printed output; however, the input can be speech and the output can be speech generated, for example, from the output of an optical character reader.

The invention is hereinafter described with reference to the accompanying drawing, the single FIGURE of which is a block diagram of a system to practice the invention.

Turning now to the drawing, the system shown at 101 serves to achieve automatic recognition of text 2. In the disclosed embodiment the text at 2 is scanned by an optical scanner 1 which provides electrical signals derived from the text scanned, which electrical signals are the electrical analog of words in the text. The electrical signals are transmitted along a conductor 5 to an analyzer 3 which performs analysis to achieve automatic recognition of the individual letters in a word on the basis of: channel characteristics in the form of probabilities that a particular letter is a corruption of another letter or class-conditional probabilities associated with the observed electrical signal or feature sets derived therefrom; the probabilities of the letter occurring serially with other recognized letters; and lexical information in the form of acceptable words (or prefixes) represented as a graph structure. The output of the analyzer 3 is fed to an output device 4 (e.g., a printer). Typically the optical scanner 1 and the analyzer 3 are one piece of apparatus as indicated by the broken line 102 which may be an optical character reader (OCR) whose output 6 is connected to a word processor at 4, the signals at 6 being in the form of binary digital bits. On the other hand, the output 6 can be fed to a device at 4 which is capable of generating speech (e.g., for the blind).

The present system effectively merges a bottom-up refinement process based on the use of transition probabilities with a top-down process based on searching a trie structure representation of a dictionary. As above indicated, two types of bottom-up information are employed: probability of letter shape (represented as a feature set) conditioned on true letters and the probability of a letter occurring when the previous letters are known (transitional probability). Results of experimentation employing the present teachings show a significant increase in correction rate over predecessor systems that do not use lexical information and show no increase in the order of complexity. Owing to its superior performance, the concept herein is suggested as a word hypothesization component in a system focusing global contextual knowledge on the text-recognition or speech-recognition problem. A formal statement of what the inventors call procedure dictionary-viterbi, is given below. The procedure is stated as an error corrector for text that may contain substitution errors. It can be simply modified for classifying electrical signals or feature sets by allowing X to consist of a set of m observed electrical signals or feature sets.

```
procedure dictionary-viterbi (X₁ ... Xₘ; Z₁ ... Zₘ);
(*given an m-letter string X = X₁ ... Xₘ as input, produce
an m-letter string Z = Z₁ ... Zₘ as output*)
begin
initialize (A);
dictionary-trace (A, C, S, Q, X₁ ... Xₘ);
select (A, C, S, Z)
end; (*dictionary-viterbi*)
```

The above statement is explained in some detail in what now follows, wherein there is described, in order, the procedures initialize and dictionary-trace, and the procedure select. Procedure initialize selects the d most likely alternatives for each letter of the input word. This is done by choosing those d letters for which the sum of the log-confusion and log-unigram probabilities is greatest. This procedure refers to the following primitive function: max(G:array [1 ... r] or real; var u:integer), which returns the maximum of the elements of an array G, with the side effect that u contains the index of the maximum element.

```
procedure initialize(A);
var Y:real;
begin
for i:= 1 to m do
begin
for j:= 1 to r do
begin
A[j,i]:= false;
W[j]:= log P(Xᵢ|Lⱼ) + log P(Lⱼ)
end;
for k:= 1 to d do
begin
Y:= max(W,u); (*determine index of maximum element u*)
W[u]:= -inf; (*a large negative number*)
A[u,i]:= true
end
end;
end; (*initialize*)
```

An alternative way of implementing initialize is to select a variable number of alternatives for each letter based on a threshold t. In this case the k loop above is replaced by

```
for k:= 1 to r do
   if W[k] > t then A[k, i]:= true;
```

Procedure dictionary-trace, described next, returns a set of letter strings in vector S whose costs are defined by vector C. In addition to calling function max, as defined for procedure initialize, this procedure refers to the following primitive procedure: concat(s1, s2:string; Lⱼ:char), which concatenates character Lⱼ at the end of string s2 and returns the result in s1.

```
procedure dictionary-trace(A, C, S, Q, X₁ ... Xᵢ);
var (*C1, S1, Q1, Q2, G are local vectors of r elements*)
begin
if i > 1 then begin
dictionary-trace(A, C, S, Q, X₁ ... Xᵢ₋₁);
C1:= C; S1:= S; Q1:= Q; Q2:= Q;
for j:= 1 to r do begin
if A[j, i] then begin
for k:= 1 to r do
if A[k, i − 1] and access-trie(Q1[k], Lⱼ)
then G[k]:= C1[k] + log P(Xᵢ|Lⱼ) + log P(Lⱼ|Lₖ)
else G[k]:= -inf;
C[j]:= max(G, u);
Q2[j]:= Q1[u]; Q1:= Q;
if (C[j] < > -inf)
then concat(S[j], S1[u], Lⱼ)
else S[j]:= null
end; Q:= Q2
end
else (*i = 1*)
for j:= 1 to r do
if A[j,1] and access-trie(Q[j], Lⱼ)
then begin
C[j]:= log P(Xᵢ|Lⱼ) + log P(Lⱼ|B); (*B is the word delimiter symbol*)
S[j]:= Lⱼ end
else begin
C[j]:= -inf; Q[j]:= nil;
S[j]:= null end
end; (*dictionary-trace*)
```

Procedure select returns the most likely word by considering the cost of the transition from the final symbol to the trailing delimiter B using the cost vector C and the survivor vector S. If all the values in C are equal to minus infinity, X is rejected and a null value is returned.

```
procedure select(A, C, S, Z)
    var y:real;
    begin
    for k:= 1 to r do
        if A[k, m]
        then
        b:C[k]:= C[k] + log P(B|L_k)
        else
        C[k]:= -inf;
    y:= max(C,u);
    if (y > -inf)then Z:= S[u]
    else Z:= '_' (*reject string*)
    end; (*select*)
```

The integration of the dictionary into the VA is done in procedure dictionary-trace by maintaining a vector of pointers into the trie. Each element corresponds to a survivor string. At each iteration of the k loop the kth element of this vector is passed to access-trie. If the corresponding initial substring concatenated with the letter indicated by the j index is a valid dictionary string (access-trie is true), the probability calculation is carried out. A weight of minus infinity is given to this alternative when a false value is returned to preclude the possibility of nondictionary words being considered. At some iteration in the j loop, if all attempted concatenations fail to produce a valid dictionary string, the survivor for the corresponding node and its pointer are assigned null values. For some value of i, if all survivors are null, the input word is rejected as uncorrectable. This may occur when fewer than r possibilities are considered for each letter but will never happen when all candidates are allowed. This phenomenon is discussed further in the papers cited above.

A variation of procedure dictionary-viterbi is not explicitly to maintain survivor strings but to derive them from a vector of pointers Q. However, this would necessitate son-to-father pointers to allow a path to be traced from each node back to the first level of the trie to retrieve the string. This would yield a storage economy when the number of nodes was less than the number of locations required for the survivor strings due to the additional backward pointers.

Procedure dictionary-viterbi can be modified to handle second-order transitional probabilities by making two simple changes. In step a of procedure dictionary-trace, replace $P(L_j|L_k)$ by $P(L_j|(S[k])^{i-1},L_k)$, where $(S[k])^{i-1}$ denotes the (i−1)th letter of the kth string in vector S. In step b of procedure select, replace $P(B|L_k)$ by $P(B|S[k])^{m-1}, L_k)$.

The description herein emphasizes the text-recognition aspects of the invention as may be employed in the context of an OCR, for example, and it is with respect to such apparatus that the system described has been employed; however, the present inventors believe that the teachings can be used in the context of a speech input. In the latter context, the device 1 would be a mechanism that converts a vocal input of words to an electrical analog which would be analyzed and coverted to an output at 6 that could be printed. For example, the mechanism at 1 could be a process that segments a speech signal and thereafter extracts the phonological features contained therein.

Further modifications of the invention herein disclosed will occur to persons skilled in the art and all such modifications are deemed to be within the scope of the invention as defined by the appended claims.

What is claimed is:

1. A single-pass system to achieve automatic recognition of text, that comprises:
   means to read the text and to generate electrical signals derived from the text read, which electrical signals are the electrical analog of words in the text;
   analysis means connected to receive the electrical signals and operable to achieve automatic recognition of the individual letters in a word on the basis of the combination of
   a. channel characteristics in the form of probabilities of the observed electrical signal given that true state of nature is each of the possible letters,
   b. the probabilities of the letter occurring serially with other recognized letters that precede the letter being analyzed, and
   c. lexical information in the form of acceptable words represented as a graph structure; and
   means to present a reproduction of the text so read and analyzed.

2. A system according to claim 1 in which the means to read is an optical character reader.

3. A system according to claim 1 in which the analysis means is further operable to achieve a posteriori recognition of whole words of the text.

4. A system according to claim 1 in which the means to present is a printer.

5. A system according to claim 1 in which the means to present is operable to present the input information as an output of audible, understandable sound.

6. A system according to claim 1 in which the means to read is a scanner which converts the input text to said electrical signals that characterize the letters of words in the text.

7. A system to achieve automatic language recognition, that comprises:
   means to receive the language as input in the form of structures or feature sets and to provide electrical signals derived from the structures or feature sets received, which electrical signals are electrical representations of symbols in the language so received; and
   analysis means connected to receive the electrical signals and operable to achieve automatic recognition of the individual symbols in the input information on the basis of the combination of
   a. channel characteristics in the form of probabilities of observing the particular symbol given that the true state of nature is each of the different possible letters;
   b. the probabilities of the particular symbol occurring serially with other recognized symbols that precede the symbol being analyzed; and
   c. lexical information in the form of acceptable structures represented as a graph structure.

8. A method of achieving automatic language recognition, that comprises:
   introducing language in the form of strings to a mechanism that converts the same to electrical signals derived from the strings introduced, which electrical signals are the electrical analog of words in the strings;
   analyzing the electrical signals to achieve automatic recognition of the individual letters in a word of the text on the basis of an integration of
   a. channel characteristics in the form of probabilities that the particular letter is a corruption of another letter;

b. the probabilities of the particular letter occurring serially with other recognized letters that precede the letter being analyzed, and c. lexical information in the form of acceptable words represented as a graph structure; and presenting as output a reproduction of the test so introduced and analyzed.

9. A method according to claim 8 in which the output is a printed output.

10. A method according to claim 8 in which the output is an oral output.

11. A method according to claim 8 in which the text is read by an optical character reader and then converted to the electrical signals.

12. A method according to claim 8 in which the strings are introduced as a speech input.

13. A system according to claim 7 in which said analysis means employs the viterbi algorithm to establish the probability that particular signals are the electrical analog of a particular word and in which the lexical information is in the form of a trie structure that contains a dictionary of acceptable words and which is accessed each time the viterbi algorithm establishes said probability.

14. A system according to claim 13 in which said viterbi algorithm selects the shortest path through a directed graph having nodes and edges, said nodes being established by selecting letter a posteriori probabilities that correspond to said signals and which are above a predetermined threshold, said edges being established by selecting transitional probabilities which correspond to said nodes.

15. A system according to claim 14 in which said viterbi algorithm constructs said graph in the form of a trellis having a plurality of paths, said trellis comprising nodes representing log letter a posteriori probabilities and edges representing log transitional probabilities and wherein the cost of a path through said trellis is the sum of said node probabilities and said edge probabilities along said path, wherein the lowest probability of error in said signals corresponds to the shortest path through said trellis, said shortest path thereby being selected by said viterbi algorithm.

16. A system according to claim 15 in which the nodes of said trellis are established by selecting only nodes which correspond to said particular signals for which the sum of said signal's log confusion and log unigram probabilities are among a predetermined number of the highest such sums for that particular signal.

17. A system according to claim 15 in which the nodes of said trellis are established by selecting only those nodes which correspond to signals having a probability of error above a predetermined threshold value.

18. A system according to claim 14 wherein said nodes are established by selecting a predetermined number of the highest letter a posteriori probabilities that correspond to said signals.

19. A system according to claim 14 in which said trie structure considers words as ordered lists of characters, and wherein said trie structure represents elements of said words as nodes in a binary tree so thereby represent a dictionary of allowable words.

20. A system according to claim 18 wherein access to said trie structure at each node of said trellis or graph structure is enhanced by mounting a vector of pointers for accessing said trie structure at a desired location.

21. A method according to claim 8 in which analyzing the eletrical signals employs the viterbi algorithm to establish the probability that particular signals are the electrical analog of a particular word and in which the lexical information is in the form of a trie structure that contains a dictionary of acceptable words and which is accessed each time the viterbi algorithm establishes said probability.

22. A system according to claim 1 in which said analysis means employs the viterbi algorithm to establish the probability that particular signals are the electrical analog of a particular word and in which the lexical information is in the form of a trie structure that contains a dictionary of acceptable words and which is accessed each time the viterbi algorithm establishes said probability.

23. A method according to claim 8 wherein the analyzing is achieved by the Steps, a, b, and c as serial steps.

* * * * *